000
United States Patent [19]

Kamai et al.

[11] Patent Number: 4,572,122
[45] Date of Patent: Feb. 25, 1986

[54] METHOD OF CONTROLLING INTERNAL COMBUSTION ENGINE

[75] Inventors: Kenichiro Kamai, Toyoake; Norio Omori, Kariya; Masumi Kinugawa, Okazaki; Mitsunori Takao, Kariya, all of Japan

[73] Assignee: Nippondenso Co., Ltd., Kariya, Japan

[21] Appl. No.: 558,193

[22] Filed: Dec. 5, 1983

[30] Foreign Application Priority Data

Dec. 14, 1982 [JP] Japan .................................. 57-219643

[51] Int. Cl.[4] ...................... F02B 53/02; F02D 35/02; F02P 5/10
[52] U.S. Cl. .................................... 123/206; 123/425; 123/494; 73/714
[58] Field of Search .............. 123/425, 494, 206, 207; 73/714, 115

[56] References Cited

U.S. PATENT DOCUMENTS

| | | | |
|---|---|---|---|
| 3,969,614 | 7/1976 | Moyer et al. | 123/417 X |
| 3,991,723 | 11/1976 | Myers | 123/206 |
| 4,054,111 | 10/1977 | Sand . | |
| 4,321,903 | 3/1982 | Kondo et al. | 123/440 |
| 4,397,285 | 8/1983 | O'Neill | 123/425 |
| 4,406,265 | 9/1983 | Brandt et al. | 123/425 |
| 4,449,501 | 5/1984 | Greeves | 123/425 |

Primary Examiner—Michael Koczo
Attorney, Agent, or Firm—Cushman, Darby & Cushman

[57] ABSTRACT

A method of controlling an internal combustion engine in which the pressure in a cylinder or working chamber of the engine is detected by reading the output signal which is delivered from a pressure sensor when a predetermined time has elapsed from a point of time when the pressure should be detected. Based on this pressure detection, the fuel supply amount or ignition spark timing is controlled.

3 Claims, 5 Drawing Figures

PERIOD DURING WHICH INTAKE PORT IS OPENED a
METHOD OF CONTROLLING INTERNAL COMBUSTION ENGINE

BACKGROUND OF THE INVENTION

The present invention relates to a method of detecting the pressure in a cylinder or working chamber in an internal combustion engine by means of a pressure sensor, for controlling the engine.

The intake pipe vacuum conventionally employed for controlling an internal combustion engine is affected by the atmospheric pressure or a change in exhaust; therefore, the intake pipe vacuum may represent an engine load condition slightly different from the actual one. In consequence, there are cases where control for optimizing the fuel supply or the ignition spark timing cannot be advantageously performed.

SUMMARY OF THE INVENTION

Accordingly, an object of the invention is to provide a method of controlling an internal combustion engine which is less affected by the atmospheric pressure and an exhaust change, by providing a pressure sensor that directly detects the pressure in a cylinder or working chamber of the engine, and directly detecting the pressure in the cylinder or working chamber by means of this pressure sensor.

To this end, according to the invention, there is provided a method of controlling an internal combustion engine wherein the fuel supply amount or ignition spark timing is controlled depending on the pressure in a cylinder or working chamber, characterized in that the pressure in the cylinder or working chamber is detected immediately after an intake valve or intake port is closed or when a predetermined time has elapsed thereafter. Accordingly, it is possible to effect a control of an internal combustion engine which is less affected by the atmospheric pressure and an exhaust change.

The above and other objects, features and advantages of the invention will become clear from the following description of the preferred embodiment taken in connection with the accompanying drawings.

DESCRIPTION OF THE PREFERRED EMBODIMENT

Figure 1:
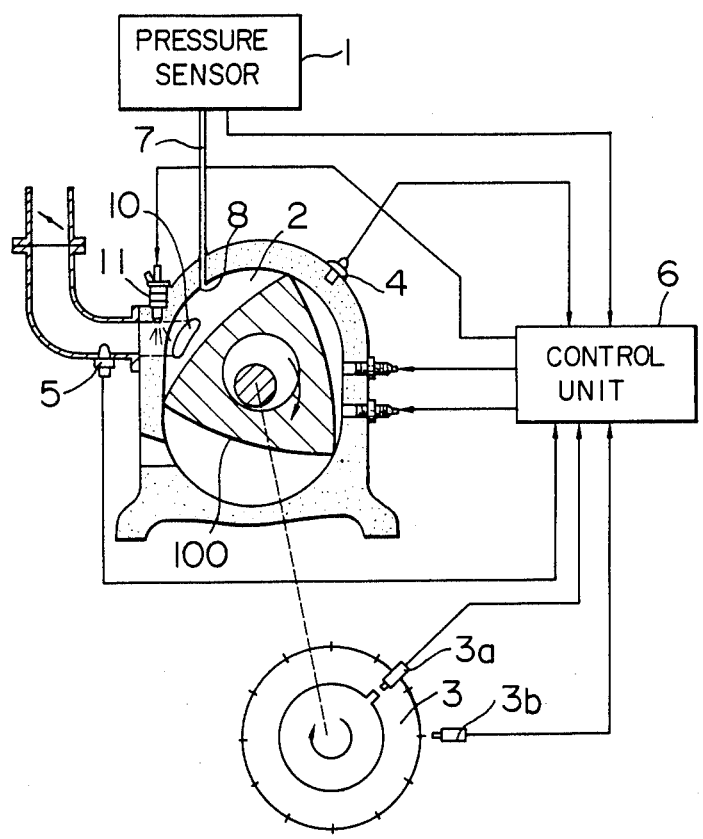
FIG. 1 is a diagrammatic view of an internal combustion engine and a detector embodying the method of the invention.

The invention will be described hereinunder through an embodiment with reference to the accompanying drawings. FIG. 1 shows an embodiment in which the invention is applied to a rotary piston engine having a single rotor.

In FIG. 1, reference numeral 1 denotes a pressure sensor containing a semiconductor strain gauge. The pressure sensor 1 detects the pressure of the fuel-air mixture charged in an intake working chamber 2 through a pressure sensing port 8 and a pressure introducing pipe 7 which are diposed within the intake working chamber 2 and on the leading side of an intake port 10. The engine speed is found from the output of the pressure sensor 1 and output signal which is delivered from a crank angle sensor 3b mounted on a crankshaft every 30° rotation of the crankshaft. A control unit 6 (referred to as "ECU", hereinafter) mainly including a microcomputer calculates a fuel supply amount corresponding to an engine operation condition on the basis of the engine speed found as mentioned above to drive an injector 11 disposed immediately before the intake port 10, thereby controlling the fuel supply amount. In this case, output signals from sensors, such as an intake air temperature sensor 5 provided on the intake pipe for measuring the intake air temperature and a water temperature sensor 4 for measuring the temperature of the cooling water, are also fed into the control unit 6 to perform a fine adjustment of the fuel supply amount.

The above-mentioned method for determining the fuel supply amount from the intake air pressure and the engine speed is widely known as the speed density system. In the rotary piston engine to which the invention is applied, as shown in FIG. 2, the amount of a fuel-air mixture freshly taken in can be known by detecting the pressure in the intake working chamber 2a at the moment a rotary piston 100 rotating clockwise as viewed in the Figure has closed the intake port 10.

Figure 2:
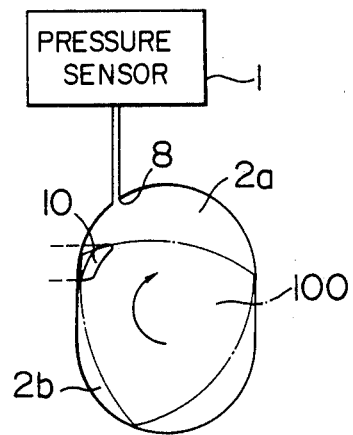
FIG. 2 is a diagrammatic view showing the detection of the pressure in a working chamber in a rotary piston engine.
Figure 3:
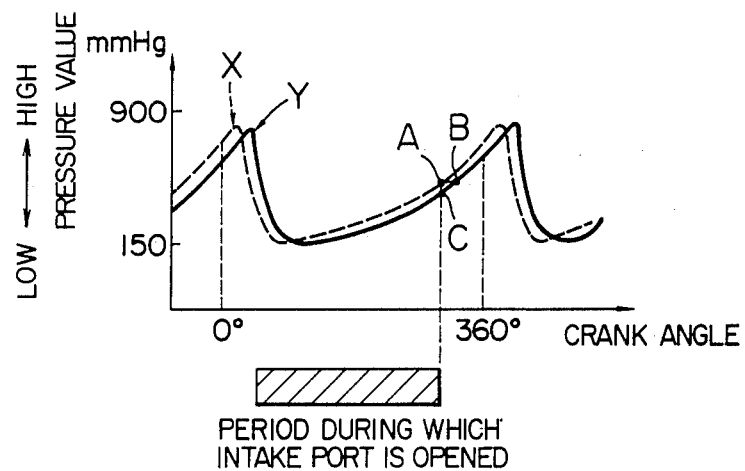
FIG. 3 is a graph showing the characteristics of the detected pressure.
Figure 4:
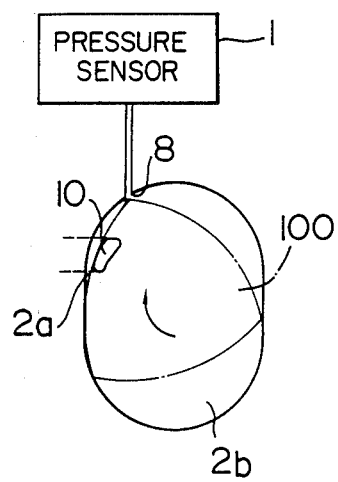
FIG. 4 illustrates a piston stroke when the highest pressure is detected.
Figure 5:
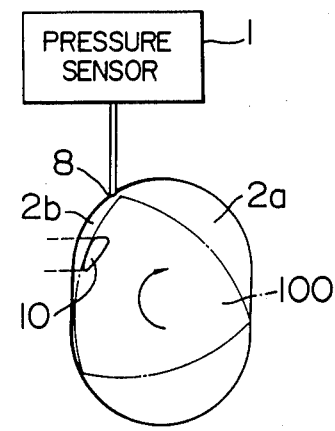
FIG. 5 illustrates a piston stroke when the lowest pressure is detected.

Referring now to FIG. 3, the pressure at the pressure sensing port 8 and the output signal from the pressure sensor 1 are plotted with respect to the crank angle. The pressure at the port 8 is represented by a curve X in FIG. 3. Owing to the position of the pressure taking-out port, i.e., the port 8, the pressure detected by the pressure sensor 1 is highest at the moment an apex of the rotary piston 100 passes by the port 8 as shown in FIG. 4. When the rotary piston 10 further rotates clockwise and the apex thereof has passed by the port 8, the pressure at the port 8 becomes negative, and the pressure at that time is lowest. After the pressure at the port 8 becomes lowest as mentioned above, fuel-air mixture is charged in the working chamber 2a, and the pressure at the port 8 shows a tendency to increase until the state shown in FIG. 2 is reached. As the rotary piston 100 further rotates to reach the state in which the apex passes by the port 8, the port 8 is under a maximum pressure and is then exposed to the pressure in the subsequent working chamber 2b.

The signal from the pressure sensor 1 is represented by a curve Y in FIG. 3. It is understood from the Figure that the curve Y has a time-lag with respect to the curve X representing the pressure at the port 8. The signal from the pressure sensor 1 is, as shown by the curve Y in FIG. 3, delivered having a time-lag with respect to the curve X representing the pressure at the port 8. This time-lag is a composite of the time required for the pressure wave to propagate through the pressure introducing pipe 7 and the response delay of the pressure sensor 1 itself. Accordingly, when it is intended to detect the pressure in the working chamber 2a at the moment the rotary piston 100 closes the intake port 10, the pressure represented by an output signal C of the pressure sensor 1 is lower than a pressure A at port 8. Therefore, if an output signal B of the pressure sensor 1 is used which has a predetermined time-lag with respect to the pressure A at the port 8, the output signal B will exactly represent the pressure in the working chamber 2a at such a moment as mentioned above to permit an accurate control. The difference in time between the pressure A at the port 8 and the output signal B from the pressure sensor 1 is, as mentioned above, the sum of the propagation delay of the pressure and the response delay of the pressure sensor 1, and it is on the order of several milliseconds in practice.

To employ the output signal from the pressure sensor 1 having a predetermined time-lag as a signal representing the pressure in the working chamber 2a at the present time, a trigger sensor 3a is provided which is adapted to generate a signal at the same time that the rotary piston 100 closes the intake port 10 as shown in FIG. 2. The ECU 6 is designed so as to take in the signal from the pressure sensor several milliseconds after taking in the signal from the trigger sensor 3a.

The matching of the above-mentioned time-lag is varied (depending on the length of the pressure introducing pipe 7 and the type of the pressure sensor 1 and is) preferably effected according to a programmed basis which can be readily changed.

Moreover, also in the case of detecting the pressure in the intake pipe, more accurate pressure data can be obtained by taking in the output signal from the pressure sensor when a predetermined time involving the delay of pressure propagation has elapsed from a point of time when the pressure should be detected. Furthermore, although one example has been shown in which the fuel supply amount is controlled on the basis of the obtained pressure data, the invention can, as a matter of course, be applied to the controlling of the ignition spark timing.

In addition, since a relatively low pressure is detected for the control of the fuel supply amount or the ignition spark timing, the pressure detection can be easily and accurately effected. Also in the case of a plurality of intake systems, the pressure detection can be effected by providing a single sensor.

Although the invention has been described through specific terms, it is to be noted here that the described embodiment is not exclusive and various changes and modifications may be imparted thereto without departing from the scope of the invention which is limited solely by the apended claims.

What is claimed is:

1. A method of controlling operation of an internal combustion engine in accordance with a pressure in an engine cylinder or working chamber into which air is sucked through an intake port for combustion with fuel, said method comprising the steps of:

connecting a pressure sensor to said engine cylinder or working chamber through a connecting pipe so that the pressure in said engine cylinder or working chamber is transmitted to said pressure sensor through said connecting pipe and said pressure sensor produces an output signal indicative of the transmitted pressure;

generating a trigger signal at a predetermined angular position of an output shaft of said engine at which position the pressure in said engine cylinder or working chamber is desired to be detected for controlling said internal combustion engine; and detecting the output signal of said pressure sensor produced after a predetermined interval of time from generation of said trigger signal so that the detected output signal is used to control the operation of said engine, said predetermined interval of time corresponding to a transmission delay of the pressure through said connecting pipe.

2. A method as set forth in claim 1 wherein said internal combustion engine is a rotary piston engine and wherein said trigger signal is produced when the intake port is closed by a rotor of the engine.

3. A method as set forth in claim 1, wherein said trigger signal is produced when the intake port is closed from the opening condition thereof.

* * * * *